US011866025B2

United States Patent
Di Stefano et al.

(10) Patent No.: US 11,866,025 B2
(45) Date of Patent: Jan. 9, 2024

(54) BRAKE-BY-WIRE BRAKING SYSTEM FOR VEHICLES

(71) Applicant: FRENI BREMBO S.P.A., Curno (IT)

(72) Inventors: Massimo Di Stefano, Curno (IT);
Samuele Mazzoleni, Curno (IT);
Beniamin Szewczyk, Curno (IT)

(73) Assignee: Brembo S.p.A., Bergamo (IT)

( * ) Notice: Subject to any disclaimer, the term of this patent is extended or adjusted under 35 U.S.C. 154(b) by 291 days.

(21) Appl. No.: 16/955,890

(22) PCT Filed: Dec. 18, 2018

(86) PCT No.: PCT/IB2018/060217
§ 371 (c)(1),
(2) Date: Jun. 19, 2020

(87) PCT Pub. No.: WO2019/123224
PCT Pub. Date: Jun. 27, 2019

(65) Prior Publication Data
US 2021/0380087 A1      Dec. 9, 2021

(30) Foreign Application Priority Data

Dec. 20, 2017   (IT) .................... 102017000147230

(51) Int. Cl.
*B60T 13/68*      (2006.01)
*B60T 8/88*       (2006.01)
(Continued)

(52) U.S. Cl.
CPC .............. *B60T 8/885* (2013.01); *B60T 7/042* (2013.01); *B60T 7/085* (2013.01); *B60T 7/12* (2013.01);
(Continued)

(58) Field of Classification Search
CPC ......... B60T 2270/402; B60T 2270/404; B60T 2270/413; B60T 2270/82; B60T 13/74;
(Continued)

(56) References Cited

U.S. PATENT DOCUMENTS 6,074,019 A    6/2000 Phillips et al.
6,220,675 B1 * 4/2001 Steffes .................. B60T 8/4845
                                                       303/11
(Continued)

FOREIGN PATENT DOCUMENTS

CN    103635367 A    3/2014
CN    106458185 A    2/2017
(Continued)

OTHER PUBLICATIONS

China National Intellectual Property Administration, Office Action in Application No. CN201880086985.0, dated Jan. 20, 2022, 8 pages.

(Continued)

*Primary Examiner* — Nicholas J Lane
*Assistant Examiner* — Stephen M Bowes
(74) *Attorney, Agent, or Firm* — Marshall & Melhorn, LLC

(57) ABSTRACT

One embodiment of a braking system for vehicles may have a first brake group and a second brake group. The first and second brake groups may have respective braking devices and electro-hydraulic actuator devices operatively connected to the first braking device. The system may also have an interconnection branch between first and the second hydraulic actuation ducts, provided with a control valve. The system may also have at least one control unit that may be programmed to actuate the control valve to control the ducts and fluidly connect the ducts.

1 Claim, 3 Drawing Sheets

(51) Int. Cl.
  B60T 7/04    (2006.01)
  B60T 7/08    (2006.01)
  B60T 7/12    (2006.01)
  B60T 8/92    (2006.01)
  B60T 15/02   (2006.01)
  B60T 17/22   (2006.01)
  B60W 10/00   (2006.01)
  B60W 10/188  (2012.01)
  B60W 30/18   (2012.01)

(52) U.S. Cl.
  CPC .............. *B60T 8/92* (2013.01); *B60T 13/686* (2013.01); *B60T 15/028* (2013.01); *B60T 17/221* (2013.01); *B60W 10/00* (2013.01); *B60W 10/188* (2013.01); *B60W 30/18109* (2013.01); *B60T 2260/09* (2013.01); *B60T 2270/402* (2013.01); *B60T 2270/404* (2013.01); *B60T 2270/413* (2013.01); *B60T 2270/82* (2013.01); *B60W 2710/18* (2013.01)

(58) Field of Classification Search
  CPC ... B60T 13/741; B60T 13/745; F16D 2125/40
  See application file for complete search history.

(56) References Cited

U.S. PATENT DOCUMENTS

| | | | |
|---|---|---|---|
| 7,497,528 | B2 | 3/2009 | Reuter et al. |
| 2002/0050739 | A1 | 5/2002 | Koepff et al. |
| 2007/0188018 | A1* | 8/2007 | Reuter ................. B60T 8/4081 303/114.1 |
| 2014/0188343 | A1* | 7/2014 | Yoshimura ............ B60W 10/08 701/41 |
| 2016/0009263 | A1* | 1/2016 | Feigel .................... B60T 11/224 303/15 |
| 2017/0240147 | A1* | 8/2017 | Kotera .................... F16D 65/22 |
| 2018/0297562 | A1* | 10/2018 | Ishikawa ............... B60T 13/662 |
| 2019/0031165 | A1 | 1/2019 | Besier et al. |
| 2019/0308601 | A1* | 10/2019 | Maj ........................ B60T 7/042 |
| 2019/0344769 | A1* | 11/2019 | Zimmermann ......... B60T 8/326 |
| 2020/0276963 | A1* | 9/2020 | Zimmermann ....... B60T 13/745 |

FOREIGN PATENT DOCUMENTS

| | | | | |
|---|---|---|---|---|
| DE | 10036287 | A1 | | 2/2002 |
| DE | 102013217954 | A1 | * | 3/2015 ........... B60T 8/4081 |
| DE | 102013217954 | A1 | | 3/2015 |
| DE | 102016203563 | A1 | | 9/2017 |
| DE | 102017222450 | A1 | * | 7/2018 .............. B60T 13/66 |
| EP | 1818235 | A1 | | 8/2007 |
| JP | 2005132306 | A | * | 5/2005 .............. B60T 13/66 |
| WO | 97/38886 | A1 | | 10/1997 |
| WO | 2018114211 | A1 | | 6/2018 |

OTHER PUBLICATIONS

European Patent Office, Office Action in Application No. EP18 845 475.5, dated Aug. 12, 2022, 6 pages.

European Patent Office, International Search Report with Written Opinion, issued in PCT/IB2018/060217, dated Apr. 2, 2019, 11 pages, European Patent Office, Rijswijk, Netherlands.

* cited by examiner

BRAKE-BY-WIRE BRAKING SYSTEM FOR VEHICLES

SCOPE

The present invention concerns a braking system for brake-by-wire vehicles.

STATE OF THE ART

The present invention refers to the sector of brake-by-wire braking systems for vehicles, both motor vehicles and motorcycles.

In the known brake-by-wire systems, the braking devices are actuated not by direct action of the driver, but rather the user's request for braking action, typically made by activating a lever or pedal, is converted into the actuation of electromechanical or electro-hydraulic means that act on the braking devices, such as calipers for disc brakes.

Autonomous driving braking systems are also known, wherein the vehicle's steering system decides the timing and extent of the braking and actuates accordingly the said electromechanical or electro-hydraulic means connected to the braking devices.

For obvious safety reasons, braking systems must provide for a back-up strategy to be actuated in the event of an electrical fault in at least one braking device or the actuator thereof.

For this purpose, brake-by-wire systems are known for example wherein, in the event of an electrical fault, the braking action is exerted mechanically, by traditional means, i.e. by hydraulically connecting the lever or pedal operated by the user to request the braking action directly with said braking devices.

However, such systems have the disadvantage of requiring the physical intervention of the user who must, by his/her own mechanical action, compensate for the electrical malfunction, exerting a direct action on a lever or pedal in the traditional way.

This type of operating logic does not allow for a fully automatic system, for example in case of vehicle stability control, wherein the control unit may require the activation of one or more braking devices to correct a driver's erroneous maneuver or to avoid the onset of dynamic instability of the vehicle. In these situations, in the event of an electrical fault, the system would be bound to the manual action exerted by the user in order to brake.

Moreover, the known solutions do not allow one to still brake with 4 wheels when the system is not able to do so, due to a fault, either electrical or mechanical in nature, of an actuator or the control logic of a corner.

PRESENTATION OF THE INVENTION

The need is therefore increasingly felt to resolve the drawbacks and limitations cited with reference to the known art.

Such a need is met by a braking system for vehicles according to claim 1.

In particular, such a need is satisfied by a braking system for vehicles comprising
- a first brake group and a second brake group intended to be installed on the same axle of a vehicle or on separate axles of a vehicle,
- the first brake group comprising a first braking device, first electro-hydraulic actuator means operatively connected to the first braking device by means of a first hydraulic actuation duct,
- the second brake group comprising a second braking device, second electro-hydraulic actuator means operatively connected to the second braking device by means of a second actuation duct,
- an interconnection branch between the first and the second actuation ducts, provided with a control valve,
- at least one control unit for the brake groups, operatively connected to the electro-hydraulic actuator means and the control valve,
- the control unit being programmed to actuate the control valve so as to:
- disconnect the first and second actuation ducts from each other in the event of standard operation or absence of malfunctions of the brake groups,
- fluidically connect the first and second actuation ducts to each other in the event of an electrical or mechanical fault in a brake group.

According to one embodiment, the system comprises a first control unit operatively connected to the first electro-hydraulic actuator means and to the control valve, and a second control unit operatively connected to the second electro-hydraulic actuator means and to the control valve, so that the control valve may always be actuated by at least one control unit.

According to one embodiment, said first and second control units are operatively connected to each other, each to monitor the operation of the other.

According to one embodiment, each electro-hydraulic actuator means is fluidically connected to at least one brake fluid tank by means of a supply duct provided with a blocking device suitable to disconnect the brake fluid tank from each electro-hydraulic actuator means in case of fault.

According to one embodiment, the blocking device comprises a non-return valve that allows brake fluid to flow from the tank to the supply line, but not vice versa.

According to one embodiment, each electro-hydraulic actuator comprises an electric motor operatively connected to a relevant float by transmission means that form a reversible kinematic connection.

According to one embodiment, each electro-hydraulic actuator means is provided with an operating sensor suitable to monitor the relative operating condition and to send the corresponding control unit an indication of standard or fault operation.

According to one embodiment, the system is equipped with a manually operated lever, foot pedal and/or push button device, equipped with a relative actuation sensor so as to be able to send to the at least one control unit a braking request from a user.

According to one embodiment, the at least one control unit manages the dynamics of the vehicle and is able to perform autonomous driving and braking of the same.

According to one embodiment, the at least one control unit is programmed to perform the following sequence:
- opening the control valve and moving a first float of the first electro-hydraulic actuator means into the forward or braking position, the pressure exerted in the second actuation duct moving a second float of the second electro-hydraulic actuator means into the rearward position,
- commanding the closure of the control valve,
- moving the first float rearward,
- commanding the opening of the control valve to equalize the pressures in the first and second hydraulic actuation ducts.

The present invention also concerns a method of actuating a braking system comprising the steps of:

providing a first brake group and a second brake group intended to be installed on the same axle of a vehicle or on separate axles of a vehicle, the first brake group comprising a first brake disc, a first braking device associated with the first brake disc, first electro-hydraulic actuator means operatively connected to the first braking device by means of a first hydraulic actuation duct, the second brake group comprising a second brake disc, a second braking device, associated with the second brake disc, second electro-hydraulic actuator means operatively connected to the second braking device by means of a second actuation duct, providing an interconnection branch between the first and the second actuation ducts, equipped with a control valve, disconnecting the first and second actuation ducts from each other in the event of standard operation or absence of malfunctions in the brake groups, fluidically connecting the first and second actuation ducts to each other in the event of an electrical fault in a brake group.

According to a possible embodiment, the method of implementation of a braking system comprises the steps of:

opening the control valve and moving a first float of the first electro-hydraulic actuator means into the forward or braking position, the pressure exerted in the second actuation duct moving a second float of the second electro-hydraulic actuator means into the rearward position, commanding the closure of the control valve, moving the first float rearward, commanding the opening of the control valve to equalize the pressures in the first and second hydraulic actuation ducts.

The above sequence of steps may be repeated.

DESCRIPTION OF THE DRAWINGS

Further features and advantages of the present invention will become more apparent from the following description of the preferred and non-limiting examples of embodiment thereof, wherein.

Figure 1:
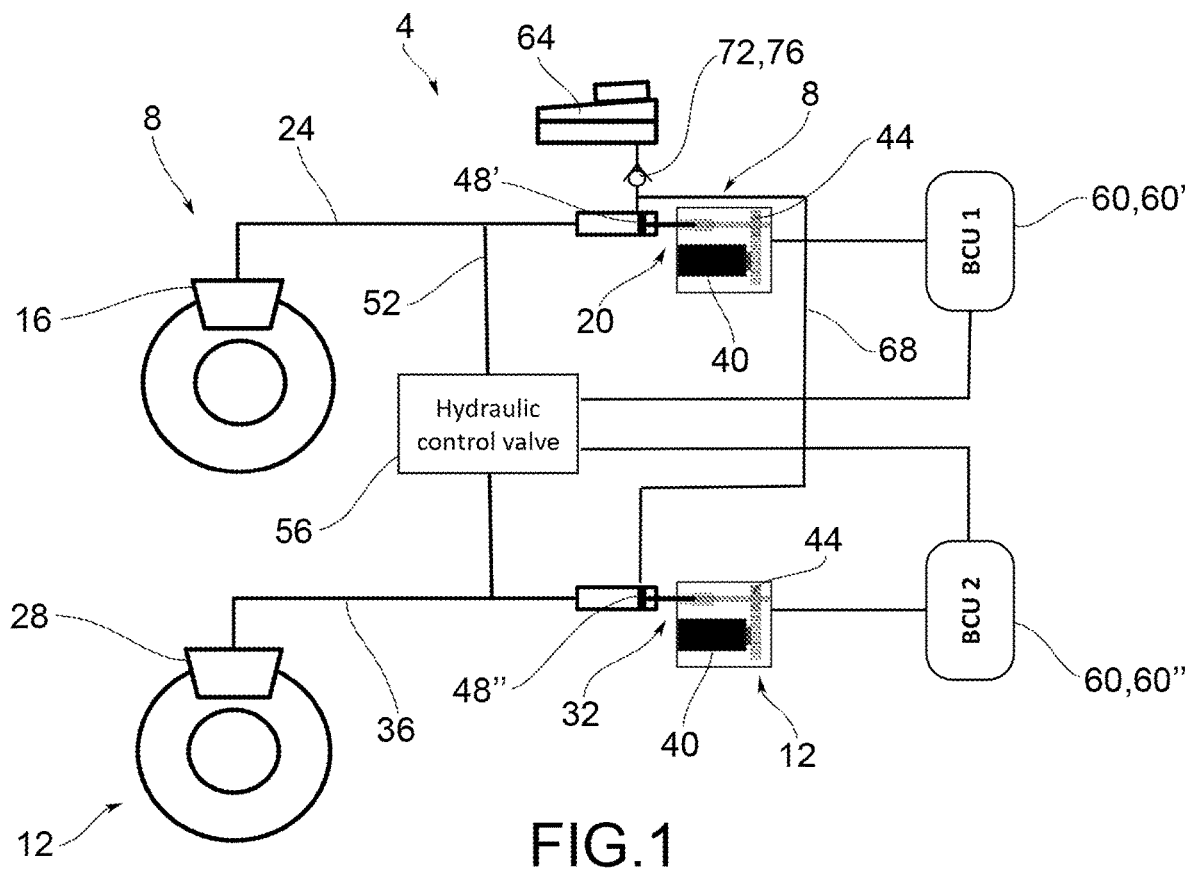
FIGS. 1-2 show schematic views of two possible vehicle braking systems according to the present invention.
Figure 2:
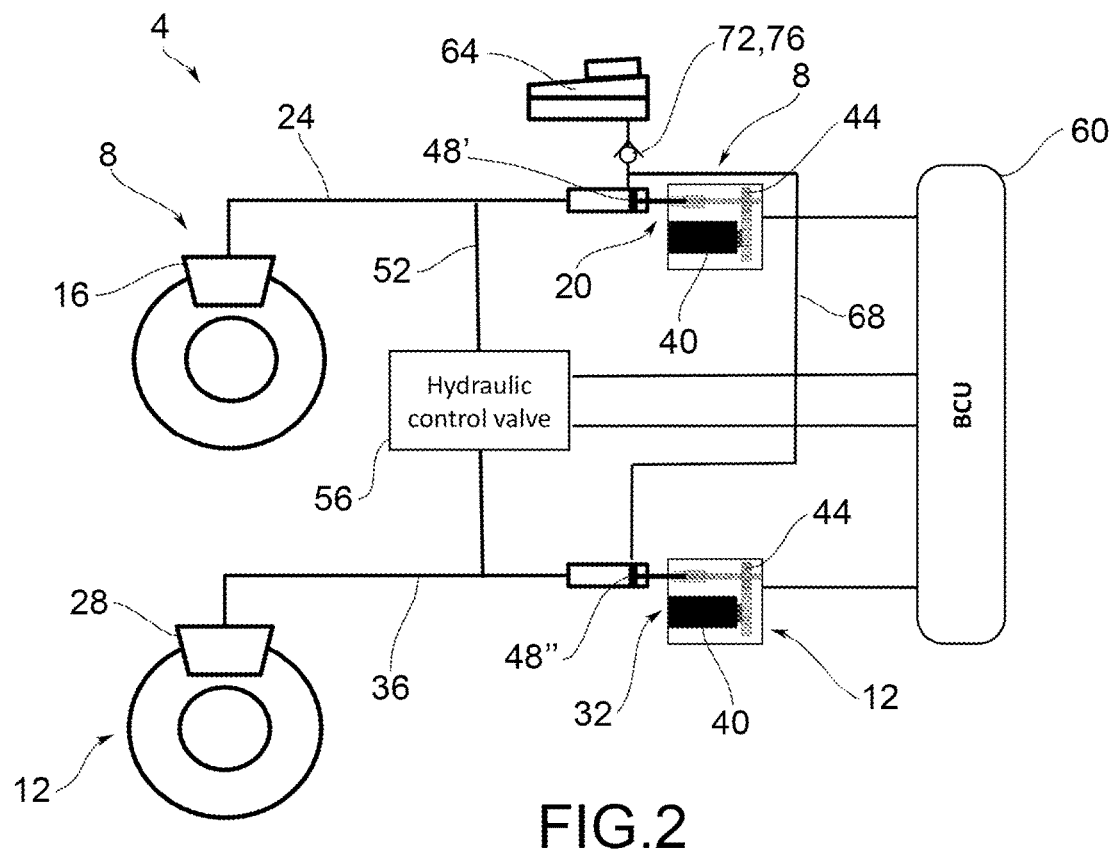
Figure 3:
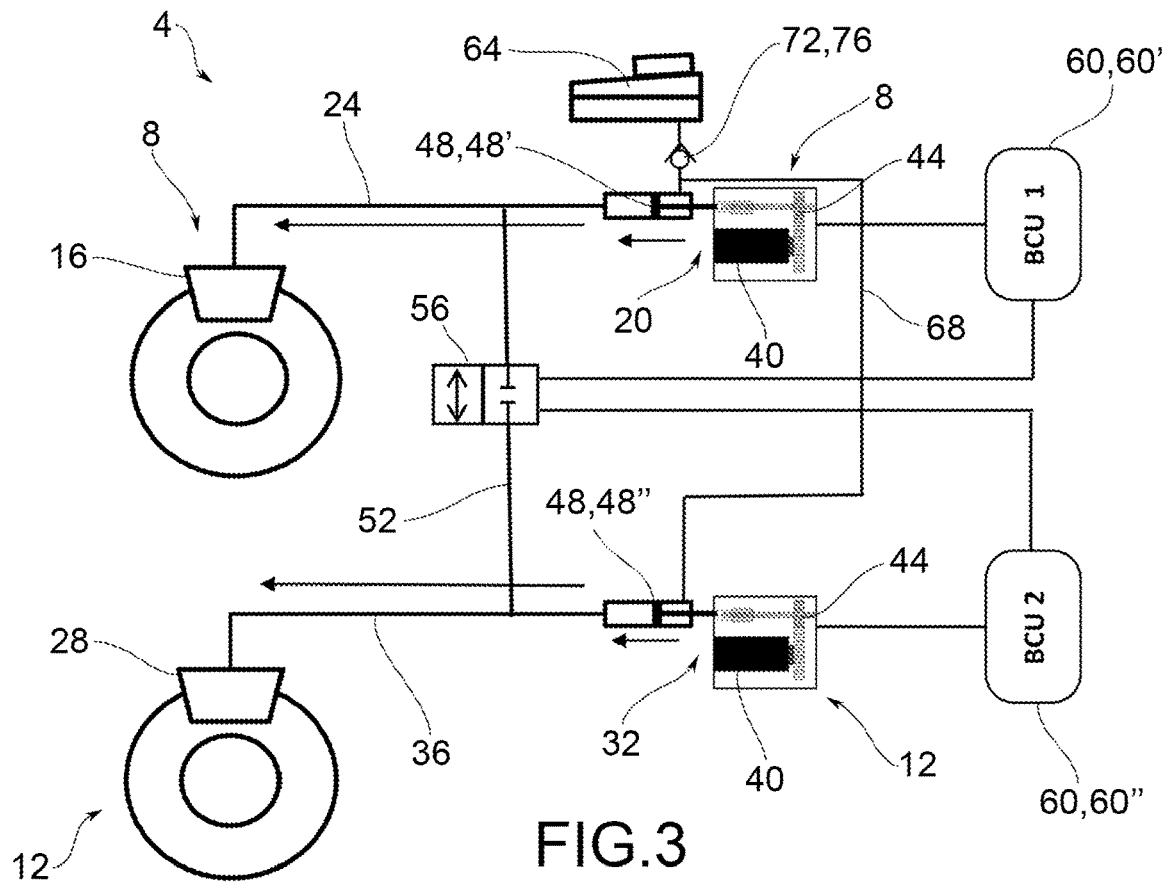
FIG. 3 shows a schematic view of a vehicle braking system according to a further embodiment of the present invention, under standard operating conditions.
Figure 4:
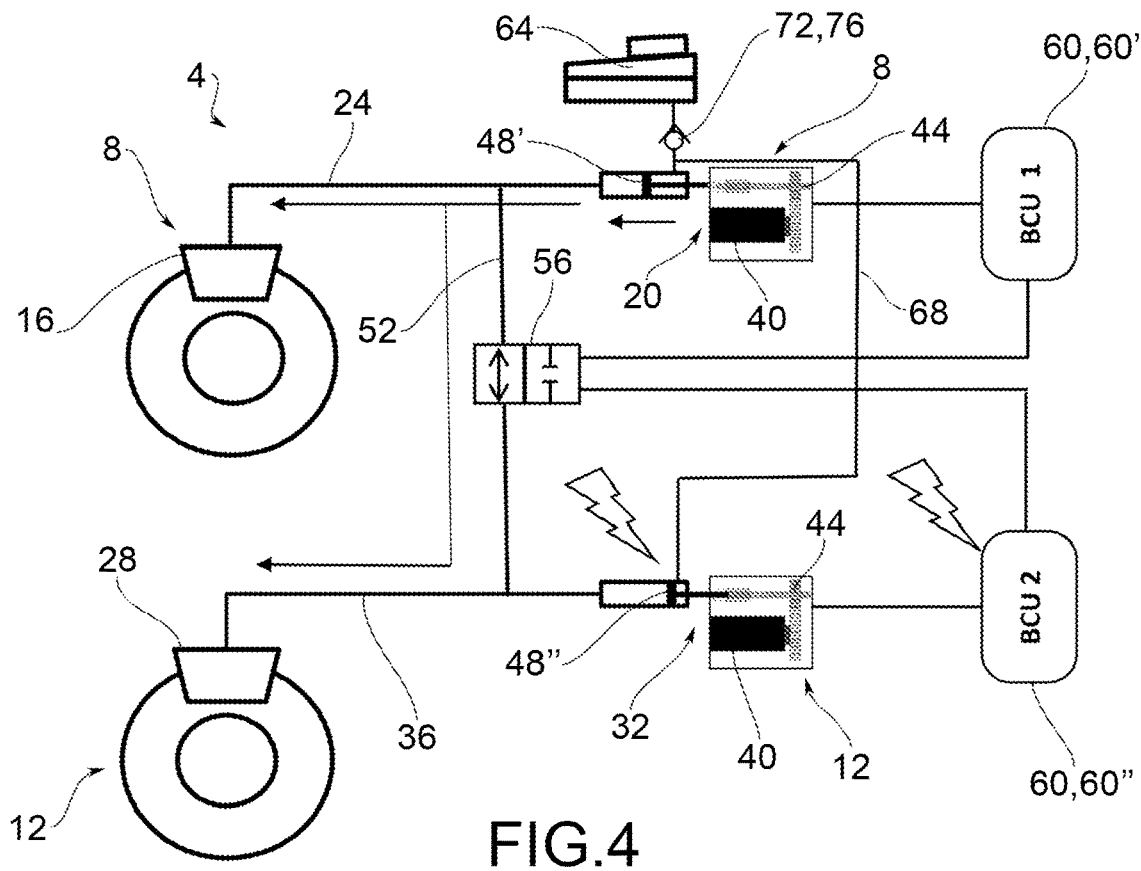
FIG. 4 shows a schematic view of the braking system for vehicles shown in FIG. 3 in the fault condition.

The elements or parts of elements in common between the embodiments described hereinafter will be indicated at the same numerical references.

DETAILED DESCRIPTION

With reference to the aforementioned figures, a braking system of vehicles is collectively indicated at 4.

For the purposes of the present invention, vehicles are defined as motor vehicles fitted with at least two wheels, thus including motorcycles, three-wheeled motor vehicles, quadricycles, motor vehicles, trucks, and so on.

The braking system 4 comprises a first brake group 8 and a second brake group 12 intended to be installed on the same axle of a vehicle or on separate axles of a vehicle.

The first brake group 8 comprises a first braking device 16 and first electro-hydraulic actuator means 20 operatively connected to the first braking device 16 by means of a first hydraulic actuation duct 24.

The second brake group 12 comprises a second braking device 28 and second electro-hydraulic actuator means 32 operatively connected to the second braking device 28 by means of a second actuation duct 36.

It should be noted that, for the purposes of the present invention, the braking devices 16, 28 may be of various types, preferably comprising a disc brake; however, drum or pad brake solutions are also included in the applications of the present invention.

The first and second electromechanical actuator means 20,32 may comprise electric motors configured so that braking devices 16,28 may be activated and deactivated.

For example, said electromechanical actuator means 20,32 may comprise an electric motor 40 connected, by transmission means 44, to a relevant float 48 which pressurizes the brake fluid sent to the braking devices 16,28, for the respective actuation thereof, through the corresponding first and second hydraulic actuation ducts 24,36.

Preferably, said transmission means 44 form a reversible kinematic connection; in this way, a hydraulic force exerted on the float may cause it to retract if the electric motor 40 is not actuated.

The braking system 4 further comprises an interconnection branch 52 between the first and the second hydraulic actuation ducts 24,36, equipped with a control valve 56.

The control valve 56, which may be of various types, in the closing configuration, disconnects hydraulically the first and second hydraulic actuation duct 24,36, while in the open configuration, connects hydraulically the first and second hydraulic actuation duct 24,36.

Advantageously, the braking system comprises at least one control unit 60 for the brake groups 8, 12, operatively connected to the first and second electro-hydraulic actuator means 20,32 and to the control valve 56.

The control unit 60 is programmed to actuate the control valve 56 so as to:

disconnect the first and second hydraulic actuation ducts 24,32 from each other in the event of standard operation or absence of malfunctions in the brake groups 8,12, fluidically connect the first and second hydraulic actuation ducts 24,32 to each other in the event of an electrical or mechanical fault in a brake group 8,12.

The disconnection between the first and the second hydraulic actuation ducts 24,32 takes place by closing the control valve 56; whereas the hydraulic connection between the first and the second hydraulic actuation ducts 24,32 takes place by opening the control valve 56.

Standard operation means a normal operating condition wherein no anomaly of the braking system is detected which is able to perform the braking action required by the user or by the autonomous driving system of the vehicle (if equipped).

An electrical fault condition is defined as a malfunction in a brake group 8,12, e.g. of the respective power supply devices, the respective piloting devices, the power sources, the electric motors 40, the electro-hydraulic actuator means 20,32, transmission means 44, which partially or totally prevents its operation.

Fault means a general malfunction condition which may comprise a problem with both mechanical components (braking devices 28 and/or electro-hydraulic actuator means 20,32) and electrical/electronic components but may also comprise a software-type problem in the management of the control unit 60, in the reading of data concerning the operation of the braking system 4, and the like.

The standard braking strategy implements the actuation of each brake group 8,12 according to the standard operating parameters of the braking system 4; whereas the fault strategy may result in a reduced or emergency actuation of a brake group 8,12 of the system 4 relative to the standard strategy.

According to a possible embodiment, the braking system 4 comprises a first control unit 60' operatively connected to the first electro-hydraulic actuator means 20 and to the control valve 56, and a second control unit 60" operatively connected to the second electro-hydraulic actuator means 32 and to the control valve 56, so that the control valve 56 may always be actuated by at least one control unit 60, 60', 60".

According to one embodiment, said first and second control units 60', 60" are operatively connected to each other, each to monitor the operation of the other.

In nominal or standard operation, the control valve 56, as seen, keeps the two hydraulic actuation ducts 24,36 isolated, not keeping them in communication with each other. In this way, each control unit 60',60" and each electro-hydraulic actuator means 20,32 may independently apply a different pressure to the first hydraulic actuation duct 24 and the first braking device 16 than to the second hydraulic actuation duct 36 and the second braking device 28. Therefore, a differentiated actuation of the braking devices 16,28 is allowed, which may allow the maximum adhesion on each corresponding wheel to be exploited or even just a differentiated braking on the braking devices 16,28 to be obtained, for example, to correct the trajectory of the vehicle, to prevent the onset of dynamic instability of the vehicle, to operate in general an active control of the vehicle even regardless of the actual request for braking action made by the user.

In the case of a fault involving a single control unit 60',60" or an electro-hydraulic actuator means 20,32, the control valve 56 must instead switch by opening to connect the first and the second hydraulic actuator 24,36.

In this way, the control unit 60',60" not in fault and the corresponding electro-hydraulic actuator means 20,32 are able to exert a common pressure on both braking devices 16,28, allowing balanced braking even if with reduced performances compared to the standard or nominal operation.

The electro-hydraulic actuator means 20, 32 in fault, normally connected to a brake fluid tank 64 when the float 48',48" is moved rearward, allows the maintenance of such pressure due to a suitable blocking device 72 that interrupts such hydraulic connection.

In effect, each electro-hydraulic actuator means 20,32 is fluidically connected to at least one brake fluid tank 64 by means of a supply duct 68 provided with a blocking device 72 suitable to disconnect the brake fluid tank 64 from each electro-hydraulic actuator means 20,32 in case of fault.

According to a possible embodiment, the blocking device 72 comprises a non-return valve 76 that allows the passage of brake fluid from the brake fluid tank 64 to the supply duct 68 but not vice versa.

The connections between the control units 60',60", the electro-hydraulic actuator means 20,32, the control valve 56, the electric motors 40 may, for example, be made by means of an electric line and/or a data transmission line, for example of the CAN type. In this way the control units 60,60',60", when a fault condition is detected, may manage the braking of the vehicle by actuating the fault strategy.

For this purpose, according to a possible embodiment, each electro-hydraulic actuator means 20,32 is equipped with at least one operating sensor (not illustrated) adapted to monitor the operating condition of the relevant electromechanical actuator means 20,32 and/or the relevant braking device 16,28 and to send a standard or fault operation indication to the corresponding control unit 60',60". Such information will then be sent to the other control units 60",60'.

The system is also equipped with a manually operated lever, foot pedal and/or push button device (not shown), equipped with a relevant actuation sensor so as to be able to send a braking request from a user to the at least one control unit 60', 60".

Preferably, said at least one control unit 60', 60" manages the dynamics of the vehicle and is able to perform autonomous driving and braking of the same.

The above-described braking system 4 may be applied to a pair of electro-hydraulic brake groups 8, 12 of a BBW (brake-by-wire) braking system according to various schemes or architectures which may comprise a single electro-hydraulically-actuated axle, a diagonal scheme wherein wheel braking groups arranged diagonally on a front and rear axle are actuated, a complete electro-hydraulic system for a motorcycle and so on.

Figure 5A:
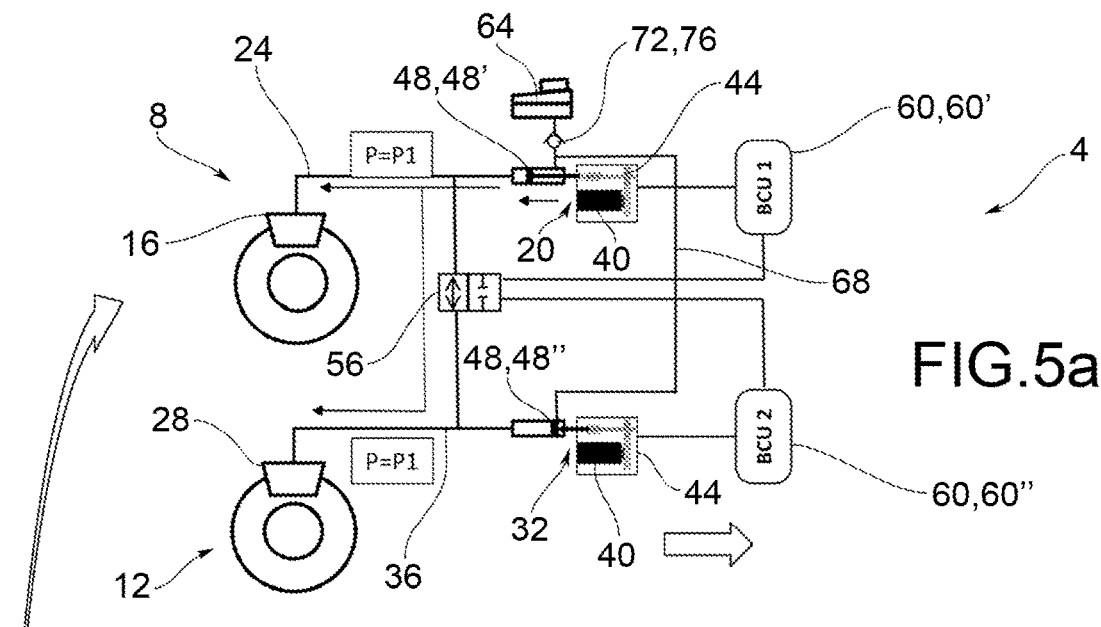
FIGS. 5a,5b,5c show a schematic view of the actuation stages of a braking system of the present invention as a parking brake for a vehicle.

According to a possible embodiment, aimed, for example, at obtaining the parking brake function (FIGS. 5*a*-5*c*), the at least one control unit 60',60" is programmed to perform the following sequence:

opening the control valve 56 and moving a first float 48' of the first electro-hydraulic actuator means into the forward or braking position, the pressure exerted in the second hydraulic actuation duct 36 moving a second float 48" of the second electro-hydraulic actuator means 32 into the rearward position (FIG. 5*a*).

It should be noted that with the second float 48" in the rearward position, the blocking device 72, such as the non-return valve 76, isolates the hydraulic connection to the brake fluid tank 64. In this condition, the pressure P inside the first and second hydraulic actuation ducts 24,36 is equal to the same value P1.

Figure 5B:
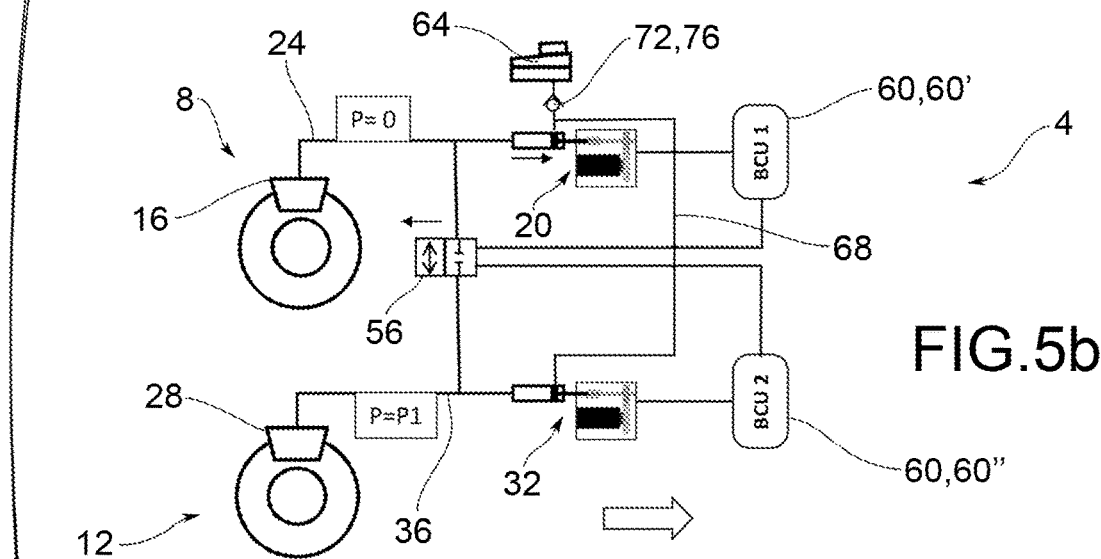
Figure 5C:
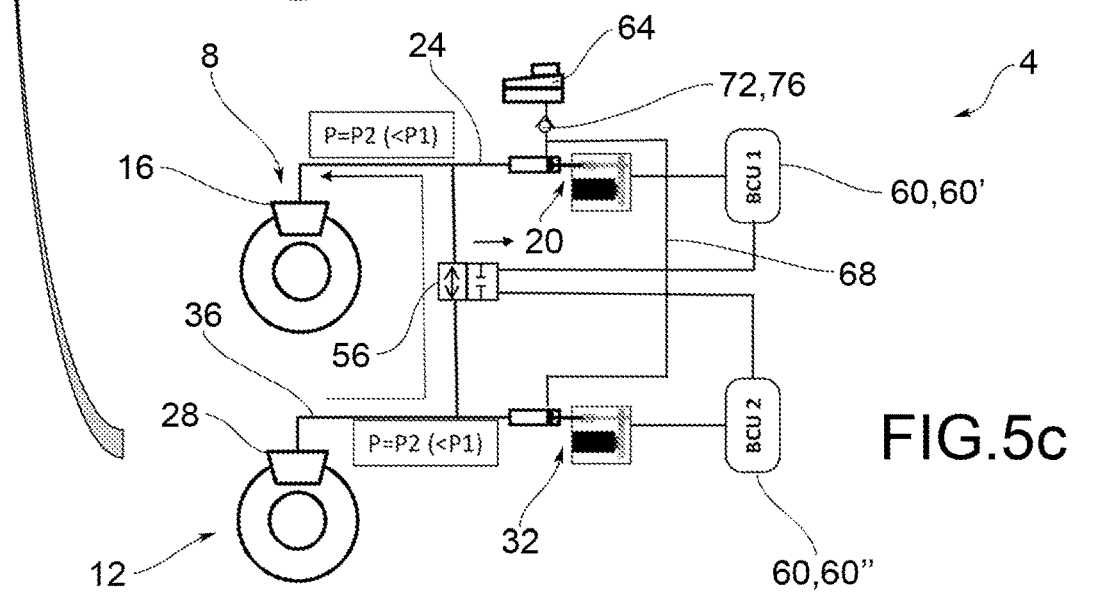

Thus the control valve 56 is closed and the first float 48' is moved rearward by the relevant electric motor 40' (FIG. 5*b*). In such condition, the pressure in the first hydraulic actuation duct 24 is substantially canceled out (obviously this is a relative value and not an absolute value), while the pressure in the second hydraulic actuation duct remains equal to the previous value P1.

Thus, the opening of the control valve 56 (FIG. 5*c*) is commanded to equalize the pressures in the first and second hydraulic actuation ducts 24,36. In such a condition, the pressure in the second hydraulic actuation duct drops to the value P2 and the pressure in the first hydraulic actuation duct rises to equal such value P2.

Also in this case, the blocking device 72, such as the non-return valve 76, isolates the hydraulic connection of the first half of the electro-hydraulic actuator means 20 toward the brake fluid tank 64.

Such pressure inside the hydraulic actuation ducts 24,36 thus obtained may be advantageously maintained without power to carry out the parking of the vehicle.

It is also possible to increase the parking pressure by repeating the sequence just described.

As may be appreciated from the foregoing, the vehicle braking system according to the invention allows the disadvantages of the prior art to be overcome.

In effect, the braking system allows, in nominal operation, to keep the hydraulic actuation ducts isolated by means of the control valve; in this way, each control unit may apply on each braking device, independently, a different pressure compared to the other device, for example of the same axle.

This independence allows one to calibrate the overall braking modes and stability control of the vehicle in the best possible way.

In the same way, in the event of a fault, the opening of the control valve makes it possible to connect the hydraulic actuation ducts together and always obtain braking of the vehicle, guaranteeing the required safety standards.

As seen, another possible use of this braking system is to apply the parking brake using the control and actuation units of only one of the two hydraulic actuation ducts; this function may be useful, for example, if one wishes to have a backup of the parking brake function performed on another axle (for example, the function may be performed with the front axle instead of the traditional rear axle because it is in a fault condition).

Moreover, the parking function may be performed on a diagonal or on a BBW system for motorcycles with 2 electro-hydraulic calipers or to have availability to perform the function with a different strategy, ensuring mechanical irreversibility by maintaining an irreversible pressure on both calipers.

A person skilled in the art, in the object of satisfying contingent and specific requirements, may make numerous modifications and variations to the braking systems for vehicles described above, all of which are within the scope of the invention as defined by the following claims.

The invention claimed is:

1. An actuation method of a braking system, comprising the steps of:

providing a first brake group and a second brake group intended to be installed on a single axle of a vehicle or on separate axles of a vehicle, the first brake group comprising a first braking device, a first electro-hydraulic actuator device operatively connected to the first braking device via a first hydraulic actuation duct, the second brake group comprising a second braking device, a second electro-hydraulic actuator device operatively connected to the second braking device via a second hydraulic actuation duct, providing an interconnection branch between the first and the second hydraulic actuation ducts, provided with a control valve, disconnecting the first and second hydraulic actuation ducts from each other in the event of standard operation or absence of malfunctions in the brake groups, fluidically connecting the first and second hydraulic actuation ducts to each other in the event of an electrical fault in a brake group, wherein to obtain a parking brake function, at least one control unit is programmed to perform the following sequence:

open the control valve and move a first float of the first electro-hydraulic actuator device into a forward or braking position, a pressure exerted in the second actuation duct moving a second float of the second electro-hydraulic actuator device into a rearward position, command the closing of the control valve, move the first float toward a rearward position, and command the opening of the control valve, to equalize the pressures in the first and second hydraulic actuation ducts.

\* \* \* \* \*